United States Patent [19]

Chadderton et al.

[11] Patent Number: 5,551,971

[45] Date of Patent: Sep. 3, 1996

[54] PARTICULATE FILTER, AND SYSTEM AND METHOD FOR CLEANING SAME

[75] Inventors: John Chadderton, Beam; David Child, Cinderford; John Deighton, Soudley, all of England

[73] Assignee: Engelhard Corporation, Iselin, N.J.

[21] Appl. No.: 355,930

[22] Filed: Dec. 13, 1994

[30] Foreign Application Priority Data

Dec. 14, 1993 [GB] United Kingdom .................. 9325492

[51] Int. Cl.$^6$ ............................ B01D 29/62; B01D 35/18
[52] U.S. Cl. .................................. 95/15; 95/20; 95/278; 95/283; 55/267; 55/283; 55/523; 55/DIG. 10; 55/DIG. 30
[58] Field of Search ................................. 95/14, 15, 18, 95/20, 278, 279, 283; 55/267, 283, 286, 287, 466, 523, DIG. 10, DIG. 30

[56] References Cited

U.S. PATENT DOCUMENTS

| | | | |
|---|---|---|---|
| 3,904,551 | 9/1975 | Lundsager et al. | 252/455 |
| 4,276,066 | 6/1981 | Bly et al. | 55/287 |
| 4,319,896 | 3/1982 | Sweeney | 55/213 |
| 4,329,162 | 5/1982 | Pitcher, Jr. | 55/523 |
| 4,331,454 | 5/1982 | Sweeney | 55/20 |
| 4,340,403 | 7/1982 | Higuchi et al. | 55/523 |
| 4,345,431 | 8/1982 | Suzuki et al. | 60/286 |
| 4,364,760 | 12/1982 | Higuchi et al. | 55/523 |
| 4,403,008 | 9/1983 | Factor | 428/117 |
| 4,404,795 | 9/1983 | Oishi et al. | 55/DIG. 10 |
| 4,411,856 | 10/1983 | Montierth | 264/267 |
| 4,427,728 | 1/1984 | Belmonte et al. | 428/117 |
| 4,436,535 | 3/1984 | Erdmannsdörfer et al. | 95/15 |
| 4,455,180 | 6/1984 | Hillman et al. | 156/89 |
| 4,510,265 | 4/1985 | Hartwig | 502/330 |
| 4,516,990 | 5/1985 | Erdmannsdörfer et al. | 95/15 |
| 4,519,820 | 5/1985 | Oyobe et al. | 55/284 |
| 4,549,399 | 10/1985 | Usui et al. | 55/283 X |
| 4,557,962 | 12/1985 | Belmonte et al. | 428/117 |

(List continued on next page.)

FOREIGN PATENT DOCUMENTS

| | | | |
|---|---|---|---|
| 4305915 | 11/1994 | Germany | 55/DIG. 10 |
| 3-130522 | 6/1991 | Japan. | |

OTHER PUBLICATIONS

"Optimized Regeneration Consitions of Ceramic Honeycomb Diesel Particulate Filters", SAE 830078, Feb. 1983, Higuchi, Mochida & Kojima (NGK Insulators Ltd.).

"Effect of Cell Structure on Regeneration Failure to Ceramic Honeycomb Diesel Particulate Filter", SAE870010, Feb. 1987, Mizuno, Kitagawa & Hijikata (NGK Insulators Ltd.).

"Effects of DPF Volume on Thermal Shock Failures During Regeneration", SAE Paper by Kitagawa, Hijikata, Makino (NGK Insulators Ltd).

"3M Diesel Filters For Particulate Emission Control, Designer's Guide", 3M 1994 Jan. 78–6970–5469–6.

"DPX® Diesel Soot Filter For Mining and Construction" Engelhard Corp., Iselin, New Jersey, Engelhard Limited, Coleford, England (Dist. by: Phenix Projects Ltd, Cinderford, glos., England).

Primary Examiner—Robert Spitzer
Attorney, Agent, or Firm—Richard A. Negin

[57] ABSTRACT

A system and related method for cleaning a particulate filter medium. The filter medium is cleaned by the input of energy to burn off particulate matter collected thereon. The system can comprise a thermocouple for monitoring the temperature of the filter medium at a plurality of locations. There is an electronic control unit for determining the point having a maximum individual temperature and creating a control signal commensurate with the maximum temperature. The control unit can determine if the control signal exceeds a predetermined set point level and if so reduces the energy input. The control unit also determines if the control signal falls within a predetermined range, also referred to as a band width of acceptable values less than the set point level. If the signal falls within the band width, the control unit controls the energy input and varies it as appropriate in order to maintain the control signal within the band width.

26 Claims, 8 Drawing Sheets

U.S. PATENT DOCUMENTS

| | | | |
|---|---|---|---|
| 4,559,193 | 12/1985 | Ogawa et al. | 264/60 |
| 4,563,414 | 1/1986 | Ogawa et al. | 430/325 |
| 4,576,774 | 3/1986 | Hazard et al. | 264/267 |
| 4,630,438 | 12/1986 | Shinzawa | 55/283 X |
| 4,651,524 | 3/1987 | Brighton | 55/DIG. 30 |
| 4,752,516 | 6/1988 | Montierth | 428/117 |
| 4,759,892 | 7/1988 | Bonzo | 264/251 |
| 4,851,015 | 7/1989 | Wagner et al. | 95/15 |
| 4,923,484 | 5/1990 | Saito | 95/20 |
| 5,042,249 | 8/1991 | Erdmannsdoerfer | 55/DIG. 30 |
| 5,044,157 | 9/1991 | Henkel | 55/DIG. 30 |
| 5,067,318 | 11/1991 | Arai | 55/283 X |
| 5,067,973 | 11/1991 | Pattas | 55/283 X |
| 5,100,632 | 3/1992 | Dettling et al. | 423/213.5 |
| 5,114,581 | 5/1992 | Goldsmith et al. | 210/650 |
| 5,221,484 | 6/1993 | Goldsmith et al. | 210/650 |
| 5,224,973 | 7/1993 | Hoppenstedt et al. | 55/DIG. 10 |
| 5,248,481 | 9/1993 | Bloom et al. | 55/DIG. 10 |
| 5,248,482 | 9/1993 | Bloom | 55/DIG. 10 |
| 5,279,630 | 1/1994 | Brinkmann | 55/DIG. 10 |
| 5,347,809 | 9/1994 | Moeckel et al. | 55/283 X |
| 5,409,669 | 4/1995 | Smith et al. | 55/DIG. 10 |

PARTICULATE FILTER, AND SYSTEM AND METHOD FOR CLEANING SAME

BACKGROUND OF THE INVENTION

1. Field of the Invention

The present invention relates to a control system that may be applied to particulate filters that utilize heat treatment as the method of cleaning. The invention includes a method, particularly suitable for cleaning the filter medium of a soot trap for a vehicular exhaust system.

2. Description of the Related Art

Since the mid-1980's, legislation has been increasing in both the United States and Europe to reduce the level of solid emissions from both on- and off-highway diesel powered vehicles. In order to comply with these and other standards such as health and safety and product spoilage issues, exhaust after-treatment specialists have explored a variety of potential soot filter media. The wallflow type ceramic honeycomb filter is the most widely employed filtration technology used in current systems for industrial applications. Wallflow filters provides an answer to the filtration requirement, yet there remains the residual problem of achieving a reliable and repeatable method of cleaning the filter. This residual problem has been the source of extensive engineering research and development as recited in Higuchi, Mochida & Kojima (NGK Insulators Ltd) "Optimized Regeneration Conditions of Ceramic Honeycomb Diesel Particulate Filters", SAE 830078, Feb. 1983; Mizuno, Kitagawa & Hijikata (NGK Insulators Ltd) "Effect of Cell Structure on Regeneration Failure to Ceramic Honeycomb Diesel Particulate Filter", SAE 870010, Feb. 1987 and an SAE paper by Kitagawa, Hijikata, Makino (NGK Insulators Ltd) entitled, "Effects of DPF Volume on Thermal Shock Failures During Regeneration".

Wallflow filter elements are particularly useful to filter particulate matter from diesel engine exhaust gases. Many references disclose the use of wallflow filters which can comprise catalysts on or in the filter to filter and burn off filtered particulate matter. A common ceramic wallflow filter construction is a multi-channel honeycomb structure having the ends of alternate channels on the upstream and downstream sides of the honeycomb structure plugged. This results in a checkerboard-type pattern on either end. Channels plugged on the upstream or inlet end are open on the downstream or outlet end. This permits the gas to enter the open upstream channels, flow through the porous walls and exit through the channels having open downstream ends. The gas pressure forces the gas through the porous structural walls into the channels closed at the upstream end and open at the downstream end. Such structures are primarily disclosed to filter particles out of the exhaust gas stream.

It is desired to remove the particulate matter from the upstream sides of the wallflow filters. One method is to provide a layer of catalyst on the wall to catalyze the ignition of the particulate matter during operation of the filter. Typical patents disclosing such wallflow filter structures include U.S. Pat. Nos. 3,904,551; 4,329,162; 4,340,403; 4,364,760; 4,403,008; 4,519,820; 4,559,193; 4,563,414; 4,411,856; 4,427,728; 4,455,180; 4,557,962; 4,576,774; 4,752,516; 4,510,265, 4,759,892, 5,114,581 and 5,221,484. Other references of interest include U.S. Pat. No. 5,100,632 and Japanese Kokai 3,130,522.

Soot filter with regeneration systems are reviewed in U.S. Pat. Nos. 4,276,066; 4,331,454; 4,319,896 and 4,345,431. U.S. Pat. No. 4,319,896 discloses a control system to clean soot filters. The gas pressure is correspondingly measured and used to help control the system. When back pressure build up reaches a predetermined point, a switch closes. One or more temperature sensors is located in the filter bed. The sensor will close a circuit switch for electrical heater units. Finally, when switches controlled by back pressure and temperatures are closed, a third switch controlled by the fuel pump and the electric heater will be turned on when a lean mixture is being used in the engine. In this way, the burning of the trapped particles is controlled.

A particularly useful particulate emission control filter directed for use for diesel exhaust is presented in "3M Diesel Filters for Particulate Emission Control, Designers Guide" published by 3M Ceramic Materials Department, printed 1994 January and hereby incorporated by reference. There is described a ceramic filter comprising ceramic fiber specified to have 62% $Al_2O_3$, 24% $SiO_2$, and 14% $B_2O_3$. The filter specification includes a white continuous fiber having a fiber diameter of 10–12 microns with a fiber density of 2.7 grams per cubic centimeter. The mechanical properties of the fiber include a filament tensile strength of 1.72 GPA, a filament tensile modulus of elasticity of 138 GPA, and elongation of 1.2%. The specified thermal properties are continuous use temperature of 1204° C., short-term use temperature at 1371° C., a lineal shrinkage at 1093° C. of 1.25%, a melting point of 1800° C., a thermal expansion co-efficient (25–500° C.) of $3.0 \times 10^{-6}$ $\Delta L/L°$ C., and a specific heat of 1046.7 J/Kg.°K. The fiber is sold by the 3M Ceramic Materials Department as NEXTEL™ FIBER. The above specified properties are for NEXTEL™ 312 CERAMIC FIBER.

The NEXTEL™ fibers are used to make diesel filters. A 3M diesel filter cartridge is illustrated in FIG. 1. The cartridge is used in a diesel engine exhaust system. Typically, a plurality of filters is assembled within a canister. The number of filter cartridges assembled in a canister is sized to the exhaust flow rates and anticipated regeneration intervals. The ceramic fiber is wound on a resistance heated cylindrical support one end of the heater is open and the opposite end is sealed. The cartridges are assembled to permit exhaust gas to pass into the canister, through the outside of the filter to a hollow inside and exit the canister from the inside of the filter cartridge. Particulate matter is trapped on the closely wound fibers.

During regeneration the electrically heated cylinder can operate at 12 volts DC using 500 watts or more of power. Current to the heater and filter regeneration intervals are determined during system design. During regeneration gas flows into the inside of the filter and exits through the outside of the filter. This gas direction allows the heater to efficiently burn the soot during regeneration, requiring minimal heater power. The electrical resistor heater can be designed to have uniform resistance or variable resistance along the length of the heater and, therefore, the filter. The 3M Diesel Filters Designers Guide discloses systems for a regeneration of the filters where the exhaust flow can be stopped during regeneration. Alternatively, a system is disclosed where one filter bank can be regenerated while a second filter bank can continuously filter exhaust gas.

While a variety of soot filters are known in the art, improvements are desired in the regeneration of systems using such filters.

SUMMARY OF THE INVENTION

The present invention is a system and related method for cleaning a particulate filter medium. The filter medium is cleaned by the input of energy to heat particulate matter collected thereon. Typically, the particulate material is combustible and is heated in the presence of oxygen to burn. The energy to burn the particulate material is controlled based on the heating requirements considering the heat generation during combustion. The system comprises a means for monitoring the temperature of the filter medium at a plurality of locations. There is a means for determining the point having a maximum individual temperature and creating a control signal commensurate with the maximum temperature. A suitable means determines if the control signal exceeds a predetermined set point level and if so reduces the energy input. A means determines if the control signal falls within a predetermined range, also referred to as a band width of acceptable values less than the set point level. If the signal falls within the band width, the means controls the energy input and varies it as appropriate in order to maintain the control signal within the band width.

The invention can be used to advantage in particular in a vehicular exhaust in which the filter medium is, for example, a ceramic fiber or wallflow monolith. The invention preferably uses fiber wound cartridges. The fiber:wound cartridge comprises of two basic elements, the fibers and the heated core also referred to as a heater. The method of construction is to take a cylindrical heating element with one end sealed, the other open. Onto these cylinders a ceramic fiber is wound to form a bobbin type of structure. Filtration of the exhaust stream is achieved by passing the exhaust flow through the windings of the cartridge. Preferably, the exhaust gas flows into the center of the core, through circumferential openings in the core, through the fiber windings and out of the outer surface of the windings. As the soot load accumulates, the windings exert more back pressure on the system and regeneration is required on a batch basis. The back pressure can be monitored. To regenerate, the central heating element is energized to create a heat source and ignite the soot, air is passed through the cartridges throughout the regeneration process to propagate the heat through the thickness of the windings. Variable parameters during the manufacturing process are the power to the heater and the efficiency of the filtration by modifying the winding pattern. A soot filter will normally consist of a number of cartridges grouped into a single housing. Application of the invention to such filters provides an advantageous improvement in performance and life of the filter.

The system monitors the temperature of the medium at numerous points, either within the same element of medium or within several separate items of medium within a composite assembly. The system creates an internal signal commensurate with the maximum individual temperature of the several points—the "Control Signal". Preferably the temperature at each point is monitored continuously to create a continuous control signal.

Preferably, the system utilizes a constant volume air supply. The system controls the electrical energy input into the medium, such that if the control signal exceeds the desired level —the "Set Point", the energy input is reduced. While the control signal is within a certain range of the set point—the "Band Width", the energy input is varied according to the level of occupation of the band width.

When using a constant electrical energy input level into the medium, the system has the ability to control the air flow rate in accordance with the set point and band width, such that the energy absorption and temperature rise of the medium is maintained within the criteria set.

The system set point is infinitely variable at a point below the melting point of the medium. The band width is infinitely variable from as low as 0.100% of the set point value to the set point value, preferably from at least ambient temperatures to the set point, and more preferably from 100 centigrade degrees below the set point to the set point.

The invention allows for the protection of the filter medium from excess heat created by the combination of the energy input to the system and the energy released upon ignition and combustion of the filtered matter, such combined heat leading to temperatures that would otherwise have detrimental effects to the successful application of the medium to the intended filtration duty.

The system can be applied to any filtration medium which, having performed its filtration duty, then uses electrical energy and preferably air to initiate and/or propagate combustion of the collected matter within the medium to return the medium to a clean state, with regards to its ability to again perform a filtration duty.

DETAILED DESCRIPTION OF THE PREFERRED EMBODIMENTS

The apparatus and method of the present invention relates to a particulate filter for collecting particulate matter filtered from fluids passing through the particulate filter and regeneration of the filter. The present invention will be apparent to those skilled in art by reference to the accompanying FIGS. 1 through 7.

The soot filters can be any suitable soot filter including wallflow honeycomb soot filters as well as soot filters formed of gauzes or screens.

Figure 1:
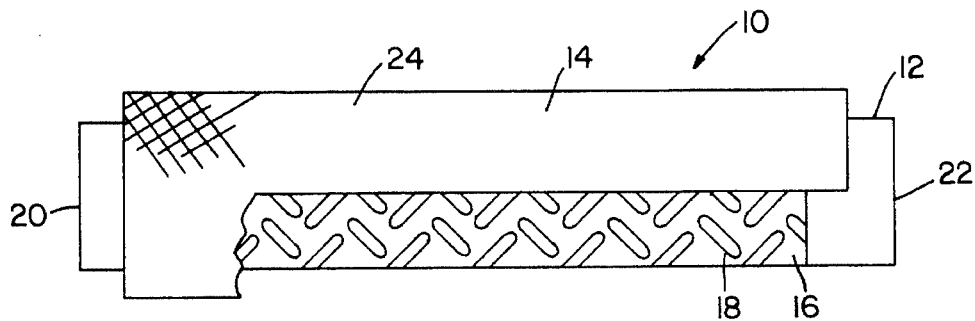
FIG. 1 is a partial sectional view of a particulate filter cartridge of the type described in, "3M Diesel Filters for Particulate Emission Control".

As indicated above, particulate filter cartridges are commercially available and disclosed in "3M Diesel Filters for Particulate Emission Control, Designers Guide" reviewed above and hereby incorporated by reference. FIG. 1 shows a conventional filter cartridge 10 which comprises a cylindrical support 12. In a preferred embodiment continuous ceramic fiber is woven in a diamond pattern on the cylindrical support to form a ceramic fiber winding 14. The cylindrical support 12 is an electric resistant heating element. As illustrated in FIG. 1 the support 12 comprises solid support circumferential areas 16 and openings 18 through the cylindrical support 12. The area of the openings can be used to control the heat input along the support 12. Where less heat is desired, support 12 can have larger openings 18 or more openings 18 at a given location. It has been found that a preferred embodiment has more or larger openings 18 in the center of the support 12. Preferably, the center section extends from one forth to one third of the distance from each end. The distribution can be varied with the most open area toward the center of the support 12. The cylindrical support 12 has an open end 20 and a closed end 22. The filter is useful to filter particulate matter from diesel engine exhaust. During engine operation gas laden with particulate matter can pass through the outer circumferential surface 24 of the ceramic fiber windings 14, through the open areas 18 of the cylindrical support 12 and out through open end 20. Alternatively and preferably, the filter cartridge can be operated in reverse. Particle laden gases can be fed into open end 20, pass through open areas 18 of cylindrical support 12 and then through ceramic fiber windings 14 and out through the circumferential surface 24 depositing its particles in the ceramic fiber windings 14.

During heating to regenerate the filter 10, an oxygen laden gas, preferably air, is fed into open end 20. Electric energy is input to heat the cylindrical support 12 which acts as a heating element or heater. The cylindrical heating element 12 heats the ceramic fiber windings 14 to a temperature sufficient to oxidize particulate matter trapped thereon.

Figure 2:
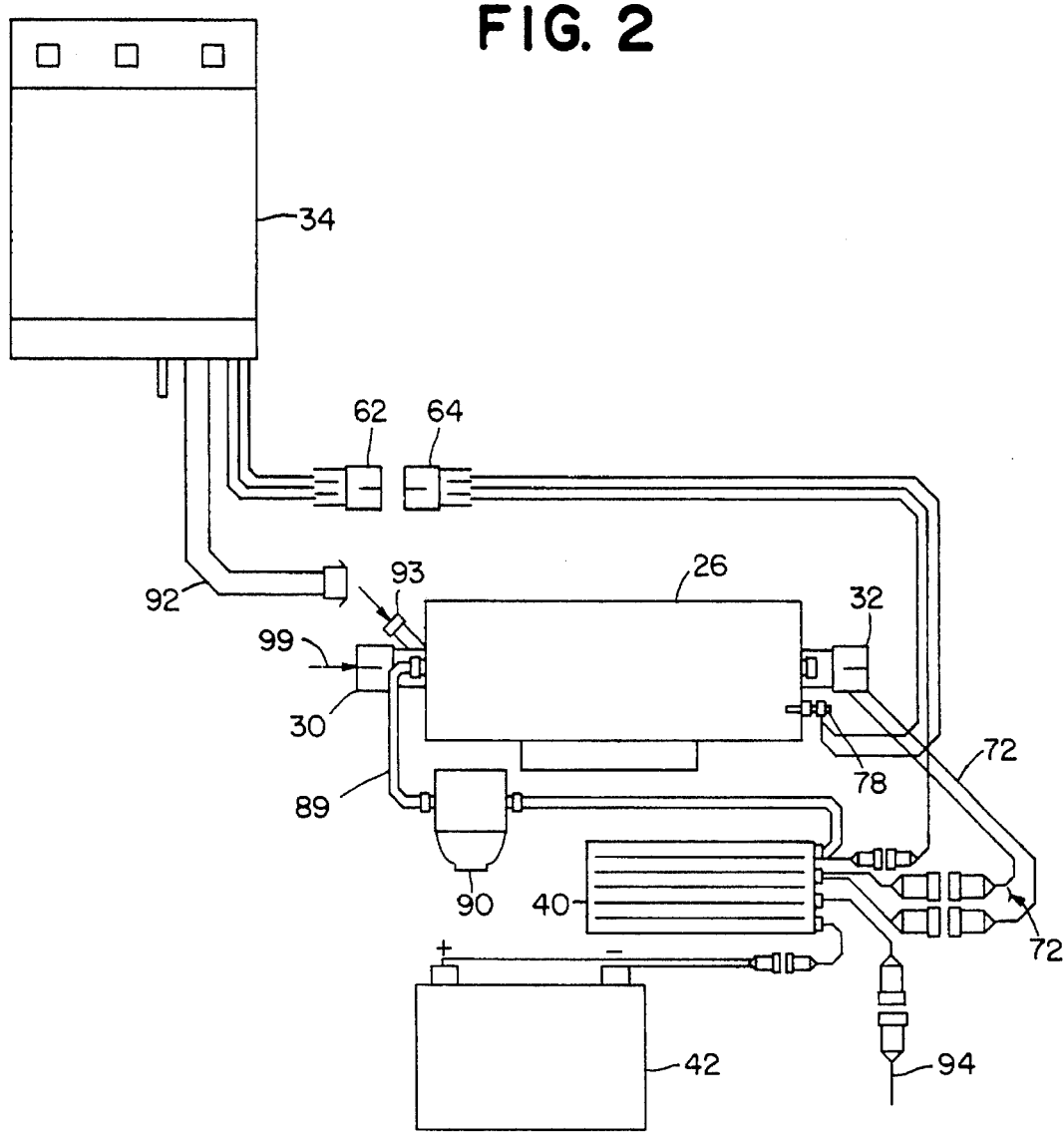
FIG. 2 is a schematic diagram of the system of the present invention.
Figure 3:
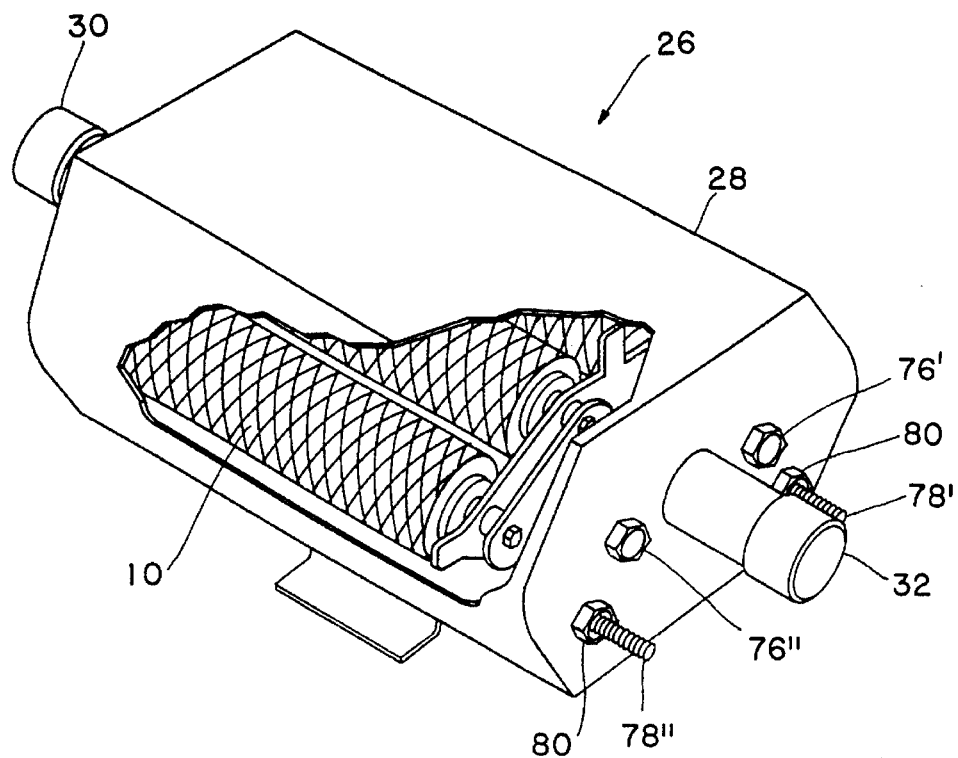
FIG. 3 is a view and perspective of the soot filter assembly of the present invention.

The preferred apparatus and method of the present invention comprise a filter assembly and related control system for regenerating a particulate filter cartridge 10 comprising ceramic fiber windings 14 on a cylindrical support heating element 12 of FIG. 1. A preferred control system is illustrated in FIG. 2, which illustrates a particulate filter 26, also referred to as a soot filter. In a preferred embodiment the soot filter 26 comprises a soot filter assembly which comprises at least 2 particulate filter elements, preferably filter cartridges 10. The filter elements comprise a particulate filter medium, preferably ceramic fiber windings, although gauze or wall-flow ceramic structures can be used. The preferred filter element comprises the FIG. 1 type particulate filter cartridge 10 having cylindrical support 12 on which the filter medium, preferably fiber windings 14, is supported. A view in perspective of a preferred soot filter assembly is illustrated in FIG. 3. FIG. 3 comprises a suitable housing or canister 28 with six filter elements, preferably filter cartridges 10 assembled within the canister. The canister 28 has an exhaust gas inlet 30 and an exhaust gas outlet 32.

Figure 4:
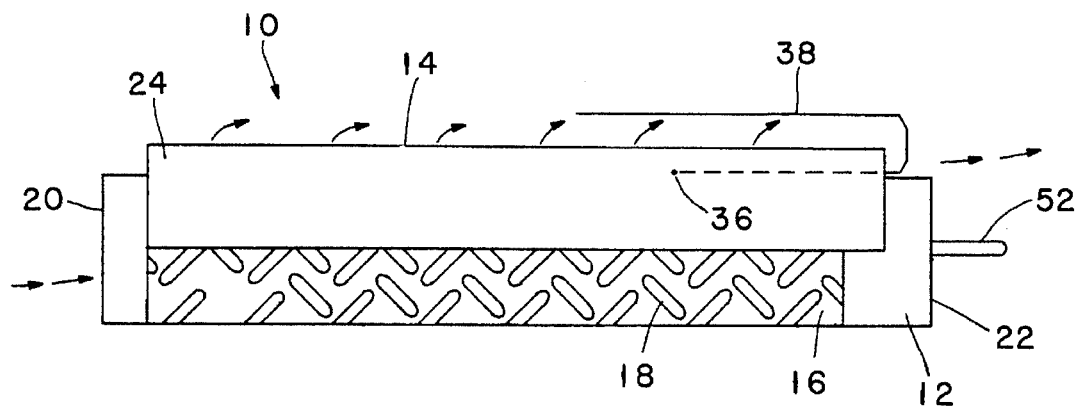
FIG. 4 is a partial cross sectional schematic view of the particulate filter of the present invention showing the thermocouple placement.

The apparatus has a means for inputting energy to heat particulate matter collected on the particulate filter such as regeneration power unit (RPU) 34. There is a means for monitoring the temperature of the ceramic fiber windings 14 of each element or filter cartridge 10 at least one location within each filter cartridge ceramic fiber winding. Referring to FIG. 4 suitable monitoring means is preferably a thermocouple, and more preferably a "K" type thermocouple. Common elements in FIGS. 1 and 4 have the same reference characters. The thermocouple 36 is located at a longitudinal distance from one end of the ceramic fiber winding 14, preferably at a longitudinal distance of one-half to one-third of the length of the winding. The thermocouple is preferably located between one and five layers of fiber outwardly from the cylindrical support 12. Most preferably the thermocouple 36 is located at a distance of two windings or two fiber diameters from the surface of the solid support 16. The thermocouple wire 38 extends longitudinally through the ceramic fiber winding 14 and emerges from the end of the winding. In accordance with the present invention it is preferred to provide each thermocouple measuring circuit with a separate power supply.

The voltage signals from each of the thermocouples pass through wires 38 to electronic control unit (ECU) 40. The electronic control unit comprises a means for determining the filter element having a maximum individual temperature and creating a control signal commensurate with the maximum temperature of any of the measuring thermocouples and therefore the particular cartridge having the maximum temperature. The ECU includes a predetermined set point value that corresponds to a preset maximum temperature and a predetermined range of values or band width less than the set point. The band width has a maximum value that corresponds to a maximum temperature. The maximum value preferably corresponds to the set point. The band width has a minimum value which corresponds to a predetermined minimum set temperature. The ECU 40 controls the RPU 34 to control the amount of power to the cylindrical supports 12 based on a comparison of the control signal to the set point and band width. The ECU comprises a means for determining if the control signal exceeds the predetermined set point. Should the set point be exceeded there is a means to signal the RPU 34 to reduce and preferably stop the energy input. The ECU 40 further comprises a means for determining if the control signal falls within a predetermined range of acceptable values less than the set point level. The range defines the band width and if the control signal falls within the band width the energy input is varied in order to maintain the control signal within the band width. If the control signal falls below the minimum band width value (or minimum temperature), the energy input is preferably a predetermined maximum value. The electrical control unit 40 further comprises a suitable power supply such as battery 42 which can be the same battery used in combination with the engine.

The system of the present invention is particularly designed and used to regenerate a diesel engine exhaust gas particulate filter cartridge. Accordingly, a preferred set point corresponds to a maximum individual cartridge temperature of from 550 to 1,050, preferably 650 to 950, and most preferably 750 to 850 degrees centigrade. A predetermined range for acceptable control signals corresponds to a temperature band width of up to 100, preferably 20–60, more preferably 25–40, and most preferably 25–35 centigrade degrees.

Any suitable source of air can be used to provide oxygen to the soot filter 26. The source can be any suitable source of air such as an air compressor or air pump. In FIG. 2, the source of air is shown to be in the same unit as the regeneration power unit 34. An air line 92 from the unit can be connected to an air hose connection 93 on the soot filter 26 when the soot filter is going to be regenerated. The amount of air used to regenerate the soot filter will depend on the size of the filter and various operating conditions. The amount of air can be controlled by the ECU 40. In accordance with the preferred embodiment illustrated here, a useful amount of air is greater than 25 liters per minute and preferably from 25 to 500, more preferably from 100 to 300 and most preferably from 150 to 250 liters per minute.

A preferred soot filter 26 useful as a diesel particulate filter is illustrated in FIGS. 3, 4, 5, 5A, and 5B. The preferred soot filter 26 comprises at least two, and preferably 2–10 filter cartridges 10. The filter cartridges are mounted in canister 28. Canister 28 comprises a canister inlet 30 and a canister outlet 32. There is an inlet plate 46 which is sealingly connected to the inside circumference 48 of the canister 28. The inlet plate 46 has openings 50. The illustrative soot filter of FIGS. 3 through 5 has six inlet plate openings 50. Each of the six filter cartridges 10 are sealingly connected to corresponding inlet plate openings 50 at the open end 20 of each filter cartridge 10.

Figure 6:
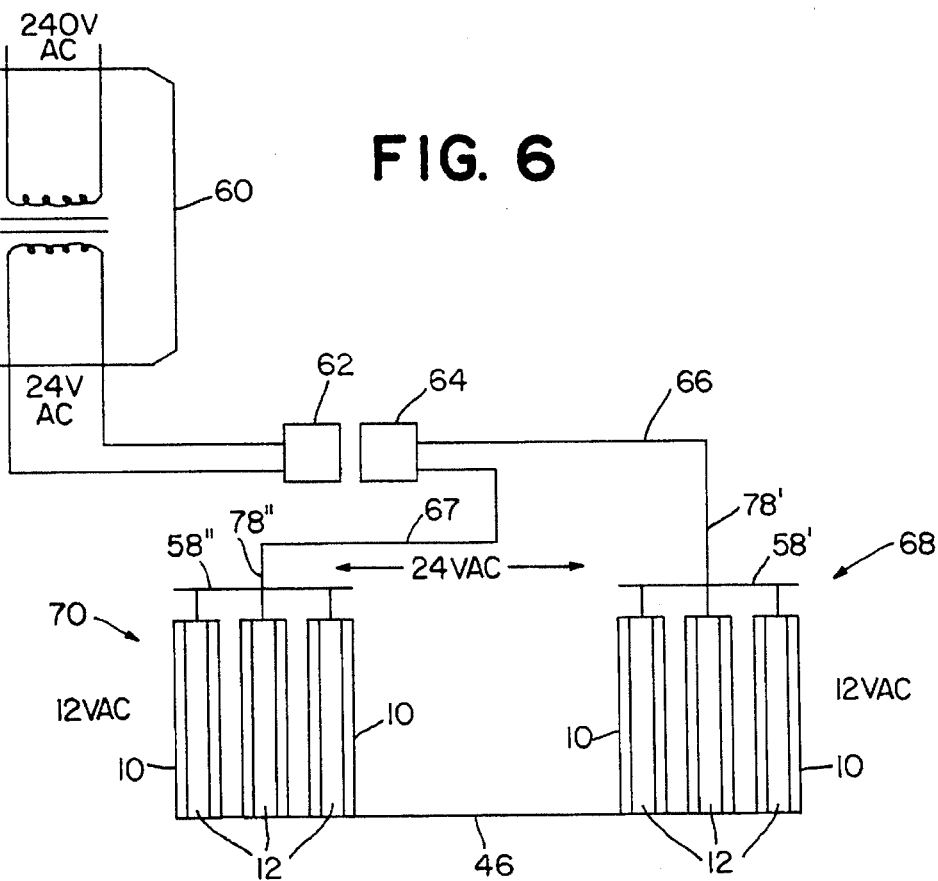
FIG. 6 is schematic wiring diagram showing a 240 volt AC circuit being used to provide current to 12 volt AC filter cartridges.
Figure 5:
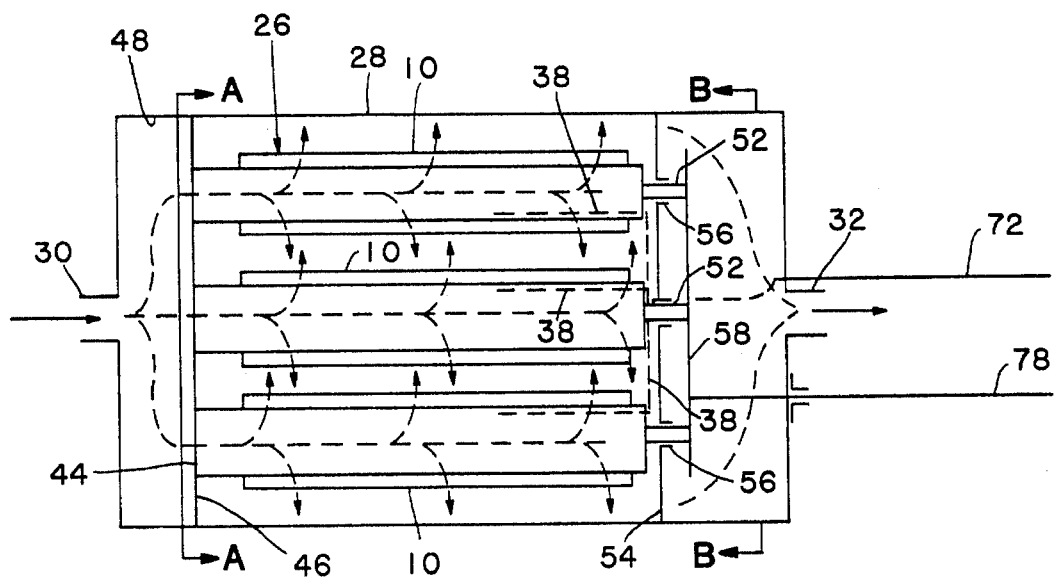
FIG. 5 is a side view of the soot filter assembly (not to scale).
Figure 5A:
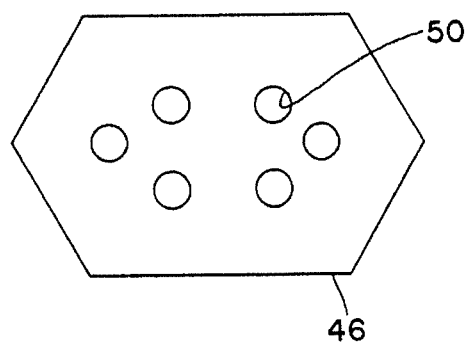
FIG. 5A is a sectional view of the soot filter assembly of FIG. 5 along line A—A.
Figure 5B:
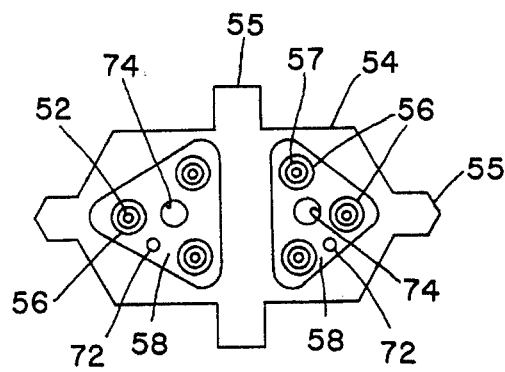
FIG. 5B is a sectional view of the soot filter assembly of FIG. 5 along line B—B.

The closed end of each filter cartridge has a closed end stud 52 connected thereto which can conduct electricity to the cylindrical support 12. There is a closed end plate 54 adapted to support the closed ends Of the filter cartridges 10. The closed end plate contains suitable means such as tabs 55 by which it is connected to the inside circumference 48 of the canister 28. There are suitable openings to permit gas to pass from the outer surface 24 of the filter cartridges 10 to canister outlet 32. In a preferred embodiment, the openings are attained by having at least a portion of the circumference of the closed end plate 54 smaller than the inside circumference 48 of the housing. Exhaust gas passing from the circumferential surface 24 of the filter cartridge 10, between the outer circumference of the closed end plate 54 and the inside circumference 48 of the canister and out through canister Outlet 32 to an exhaust pipe, then optionally to a muffler and finally to an outlet exhaust pipe and to the environment. The Closed end plate has openings 57 corresponding to the location of closed end studs 52. Preferably the closed end studs 52, the closed end plate openings 57, and the inlet plate openings 50 are co-linear. There are preferably insulator bushings 56 between the closed end openings 57 and the closed end studs 52. The closed end studs 52 can be used to conduct electricity to the cylindrical support 12. Reference is made to FIGS. 5, 5B and 6 illustrating a preferred outlet bus plate 58 configuration. Each bus plate 58 (58', 58") connects three studs 52 and thereby three cylindrical supports.

FIG. 6 illustrates a preferred regeneration power unit transformer 60 which receives 240 volt AC current and transforms it to 24 volt AC current. When it is determined to regenerate the filter cartridges 10, regeneration power unit connectors 62 are connected to particle filter power connectors 64. Wire 66 leads to the first set 68 of filter cartridges 10. It is connected to outlet bus plate 58' through bushing plate stud 78'. Electric current passes through cylindrical support 12 through inlet plate 46 to the second set 70 of filter cartridges 10. The current then passes to second set outlet bus plate 58" to bushing plate studs 78" to wire 67 and back to connector 64 to complete the circuit. In this manner, there is 12 volts of AC current passing across each cylindrical support 12.

In the preferred embodiment as illustrated in FIGS. 4–6, there is one "K" type thermo couple per filter cartridge 10. Three thermo couple wires 38 lead from first set 68 of filter cartridges 10 and three thermo couple wires 38 lead from second set 70 filter cartridges 10. There are two bushing plate studs 78' and 78" extending through the outlet end of the canister 28 and two sets of thermo couple wires 72 extending from the outlet end of canister 28. Referring to FIG. 3, each bushing plate stud passes through insulated bushing 80. Each of the three thermocouple wires passing through the outlet of the canister pass through thermo couple openings 76', 76".

Regeneration of the soot filter 26 of the present invention can be done in any suitable manner. Regeneration can be accomplished at regular time intervals. Alternatively, there can be an exhaust pressure sensor line 89 which senses the pressure in the upstream or inlet side of the soot filter 26. The pressure sensor can be a pressure transducer in the ECU 40. Referring to FIG. 2, exhaust gas pressure line 89 leads from the soot filter 26 to the ECU 40. There is a condenser trap 90 in the line to eliminate moisture which may condense prior to measuring the pressure. A pressure signal can be generated and sent via signal line 94 to the dashboard of the automobile and signal the operator that the back pressure has reached a sufficient level so as to require regeneration of the soot filter.

Figure 7:
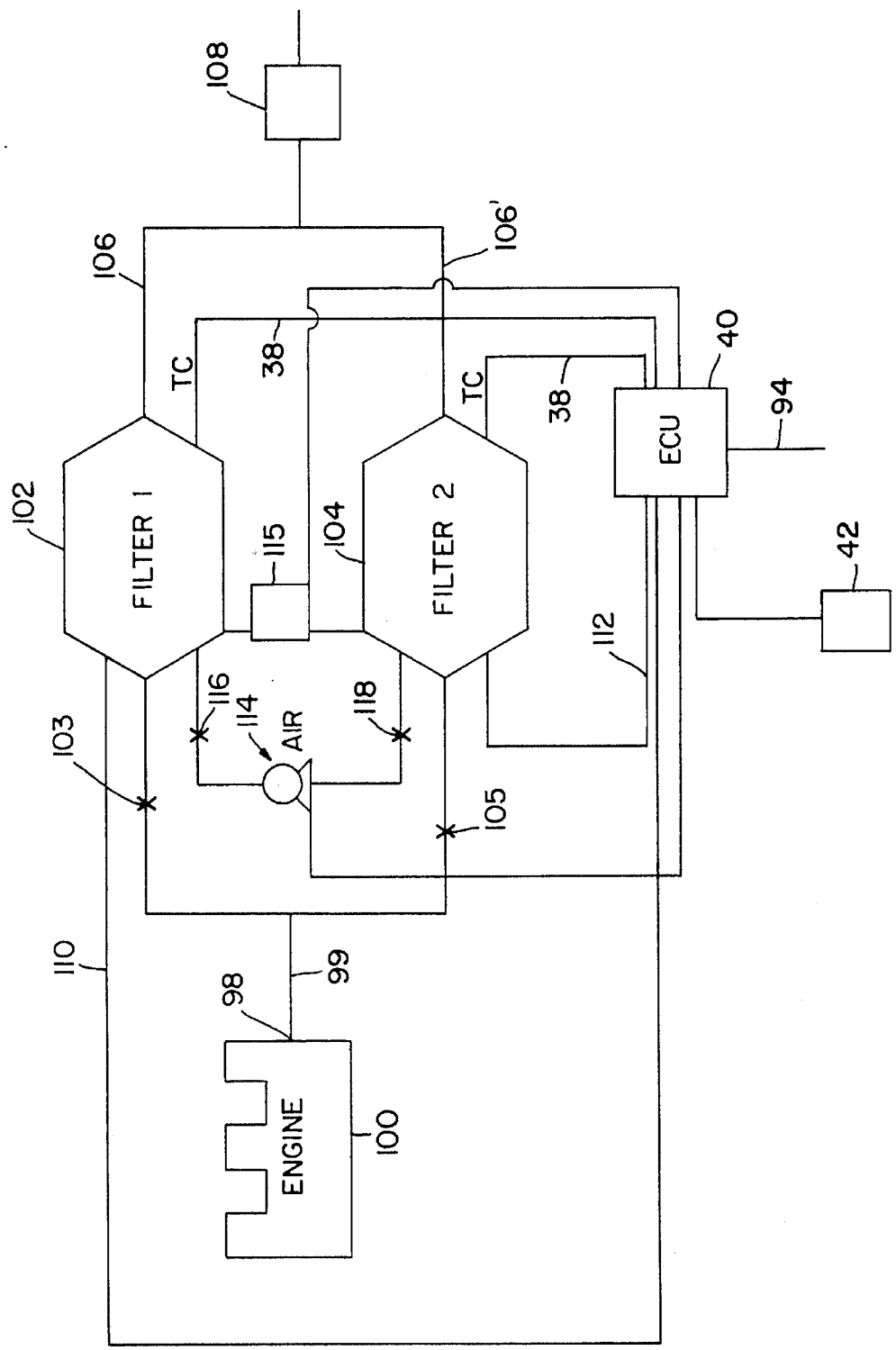
FIG. 7 is a schematic diagram of an alternative system of the present invention.

FIG. 2 illustrates a regeneration system wherein the soot filter is disconnected from the exhaust system and connected to a regeneration power unit separate from the diesel engine assembly. FIG. 7 is an alternative embodiment wherein a diesel engine assembly can have at least two soot filters in parallel, one first soot filter is in a backup mode and one second soot filter is in line in the exhaust system. The soot filter in the backup mode can be undergoing regeneration during operation of the diesel engine with the first soot filter. Common elements in FIGS. 2 and 7 have the same reference characters. Diesel engine 100 results in an exhaust stream which passes from engine outlet 98 through exhaust conduit 99. The exhaust conduit can pass to soot filter 102 or second soot filter 104. Soot filter valves 103 and 105 are in the exhaust line passing to soot filters 102 and 104 respectively. When soot filter valve 103 is open, the engine exhaust passes through soot filter 102 to exhaust conduit 106 and downstream to muffler 108. At this time, soot filter valve 105 is closed. When soot filter 104 is in use, soot filter valve 103 is closed and soot filter valve 105 opens. The exhaust gas passes through soot filter valve 105 through soot filter 104 through exhaust pipe 106' to muffler 108. The valves 103 and 105 can be controlled based on a measurement of the back pressure which is measured in the operating soot filter and signaled to the operator via pressure lines 110 and 112. The pressure is monitored in the ECU and signaled through line 94 to the operator. The system can automatically switch from one filter to the other based on back pressure measurements, regular time intervals and/or operator discretion. Each filter 102 or 104 operates in the same manner and can have the same constructions as described above and illustrated in the accompanying FIGS. 3–5. Power is supplied by a suitable power generator 115. The power can be generated by operation of the diesel engine. The energy input from the generator is controlled by the ECU 40. There can be a suitable air supply such as air pump 114 which provides air to the filter being regenerated. The air supply and air supply valves 116 and 118 can be controlled by the ECU 40. The general operation of this duel filter system parallels that of the single filter system. The advantage is that the diesel engine need not be shut down during regeneration of a soot filter.

Figure 8:
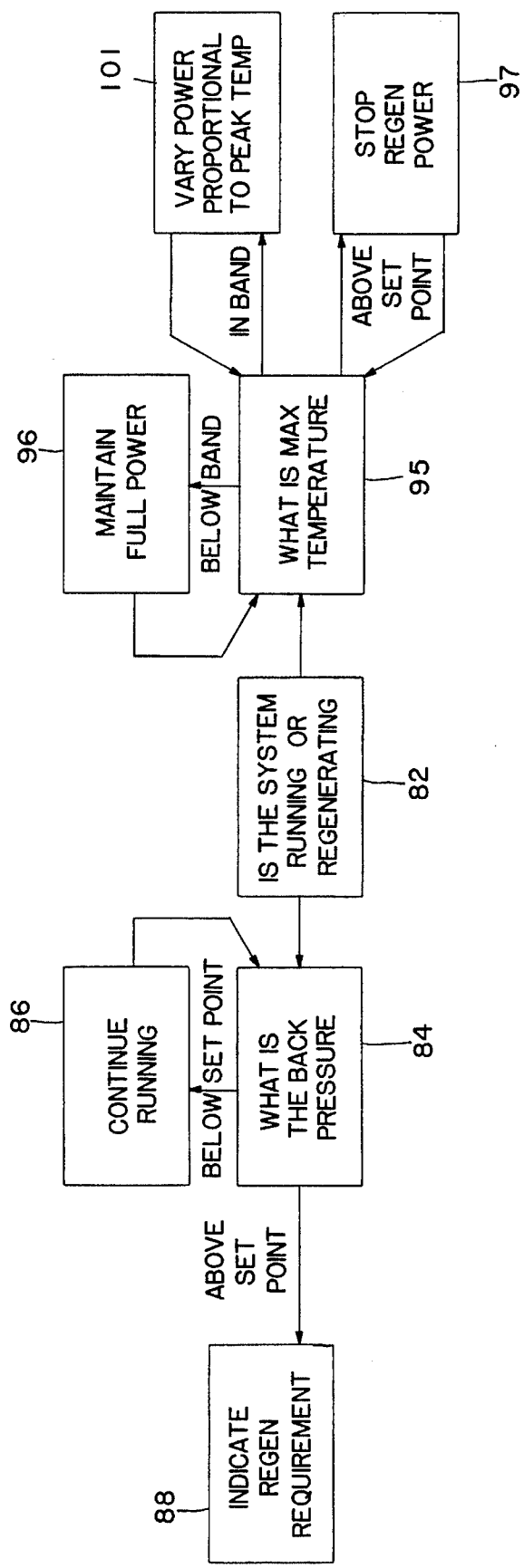
FIG. 8 is a flow chart illustrating a control system to determine when to regenerate the filter, and the regeneration control philosophy.

The method of the present invention will be understood by reference to FIG. 8 which shows the control philosophy. The method shall be described with reference to a system which contains one soot filter. That is, there is no parallel soot filter which operates while a second soot filter is being regenerated. The pressure drop over the soot filter is continually monitored. When the pressure drop over the soot filter illustrated in FIGS. 3 through 6 reaches a predetermined value it signals an indicator which indicates that regeneration is necessary. One method to determine whether the soot filter is ready for regeneration is to determine whether there is a sufficient loading of filtered particulate matter to cause the pressure drop across the soot filter element such as the filter cartridge 20 to be sufficiently high so as to create an undesirable back pressure. In using the illustrated soot filter, typically if the pressure reaches from 50 to 75 inches of water, and preferably from 50 to 65, and most preferably about 60 inches of water, the system should be regenerated.

Referring to FIG. 8, the first step is to determine whether the system should be regenerated 82. As indicated, a preferred method is to determine the back pressure, which can be done continuously or at regular time intervals as indicated in step 84. If the back pressure is below a given set point such as 60 inches of water, the system is permitted to continue to run 86 and be regenerated at regular intervals or when the system reaches a set point corresponding to maximum desirable pressure. When the system is above the set point, the answer to the test of whether the system running or regenerating is indicated in step 88. When there is an indication that regeneration is required, the soot filter can be disconnected from vehicle exhaust pipe 99 and connected to the regeneration system illustrated in FIG. 2. In accordance with the system in FIG. 2, the ECU is connected to battery 42. The thermocouple cables 72 are connected to the ECU. A condenser trap is connected to the soot filter as is an air hose 92 from the RPU 34. Additionally, the power harness connector 62 is connected to the power connector 64 which, in turn, is connected to bushing plate studs 78. Accordingly, the system is ready to operate in a regeneration mode.

Referring to FIG. 8 the control philosophy creates a control signal commensurate with a maximum temperature as indicated in step 94. Additionally, there is a predetermined set point and predetermined range defining a band width. The ECU monitors the temperature based on the thermocouple readings of each particulate filter cartridge 10 at at least one location. The ECU determines the filter having the maximum individual temperature. A control signal is created corresponding to the maximum temperature of the various thermocouple readings. The control signal is compared to the set point and to the predetermined range defining the band width. If the control signal is below the band width or below the minimum temperature corresponding to the band width range, full power is maintained as indicated in step 96. If the control signal exceeds set point corresponding to the maximum temperature of the band, the energy input is reduced and preferably stopped as indicated in step 97.

If the control signal falls within the predetermined range or band width of values less than the set point level, the energy input is controlled, preferably linearly to the temperature in order to maintain a control signal within the band width 101. Preferably the energy input varies linearly with the control signal in the band width 101. In the band width, the control signal preferably varies power proportionally from zero at the high temperature range of the band to full power at the low temperature of the band.

The present invention is illustrated further by the following examples which are not intended to limit the scope of this invention.

EXAMPLES

The present invention is illustrated using a six cartridge soot trap of the type shown in FIGS. 1–6. The cartridges used in the soot trap were manufactured by 3M Corporation, 3M Ceramic Materials Department and described in, *3M Diesel Filters for Particulate Emission Control Designers Guide*. The particular filter used was part number XW3H-19. This filter was made of NEXTEL™ 312 CERAMIC FIBER, which is a continuous metal oxide fiber indicated by 3M to be 62% $Al_2O_3$, 24% $SiO_2$ and 14% $B_2O_3$. Reference is made to the description of the fiber in the Background of the Invention. The filters are described to be made by winding the fiber in a general diamond pattern around a metal support cylinder. The metal tube is a metal electrically resistive heater. One end of the metal cylinder is open and the opposite end is closed. The circumferential surface has openings. The metal heaters are indicated by 3M to be 12 volt DC and 500 watt of power heaters. The specifications of the filter are in the 3M Designer Guide.

During operation of the filter, dirty gases flowed into the cylinder through the open end, then passed through the openings in the circumference of the tubular metal heater, through the outer surface of the filament wound cylinder, and out of the filter housing and through the exhaust gas pipe. Particulate matter became trapped within the filament windings of the filament wound cylinder. During regeneration of the filter air flowed into the open end of the heater cylinder, through the circumferential openings of the heater and out through the surface of the filament windings. Each heater operated at 12 volts DC using 500 watts or more of power as shown in FIG. 6. The air was added sufficiently to efficiently burn the trapped soot particles during regeneration.

Figure 9:
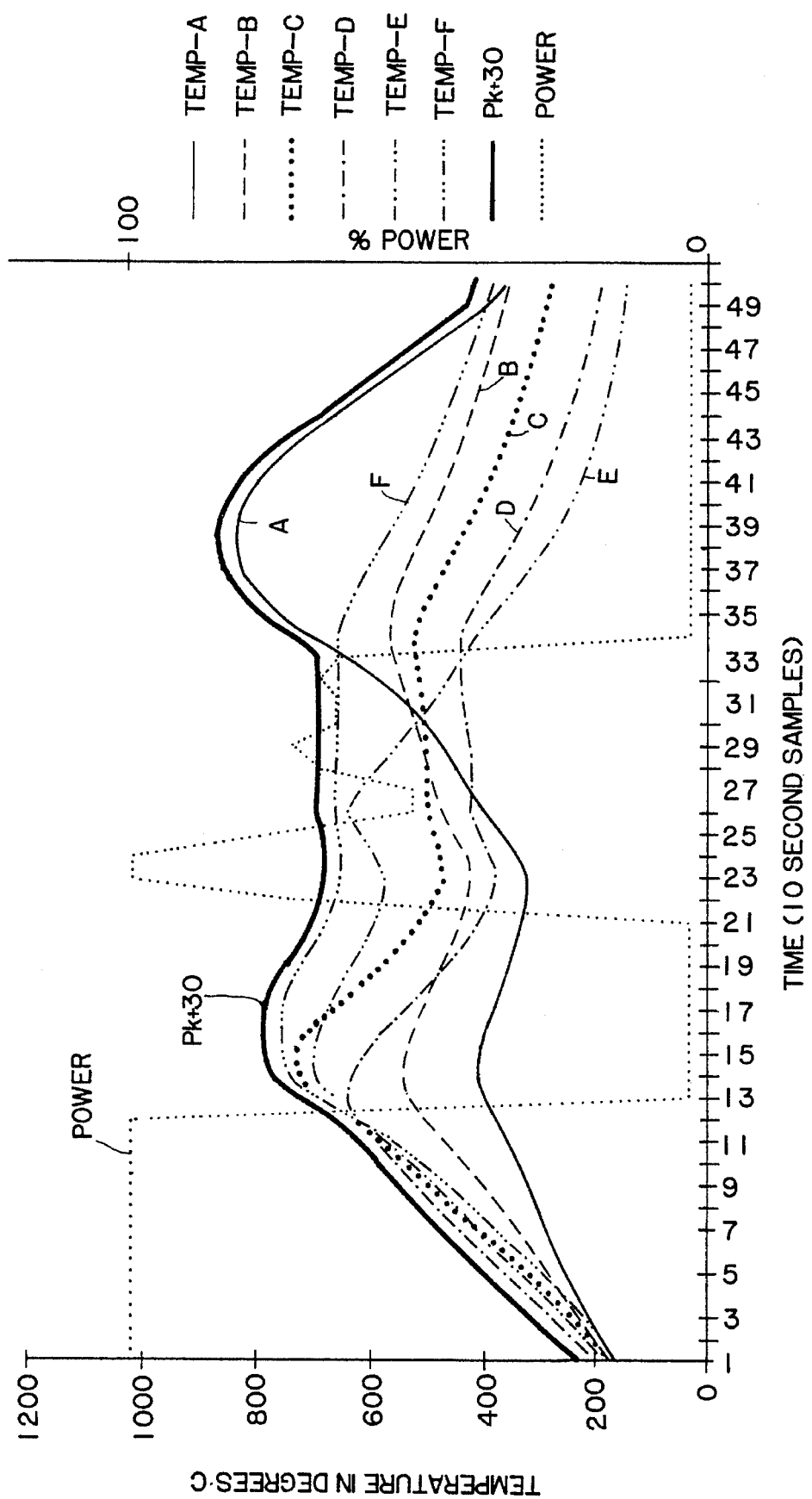
FIG. 9 is a graph of the regeneration cycle of Example 1.
Figure 10:
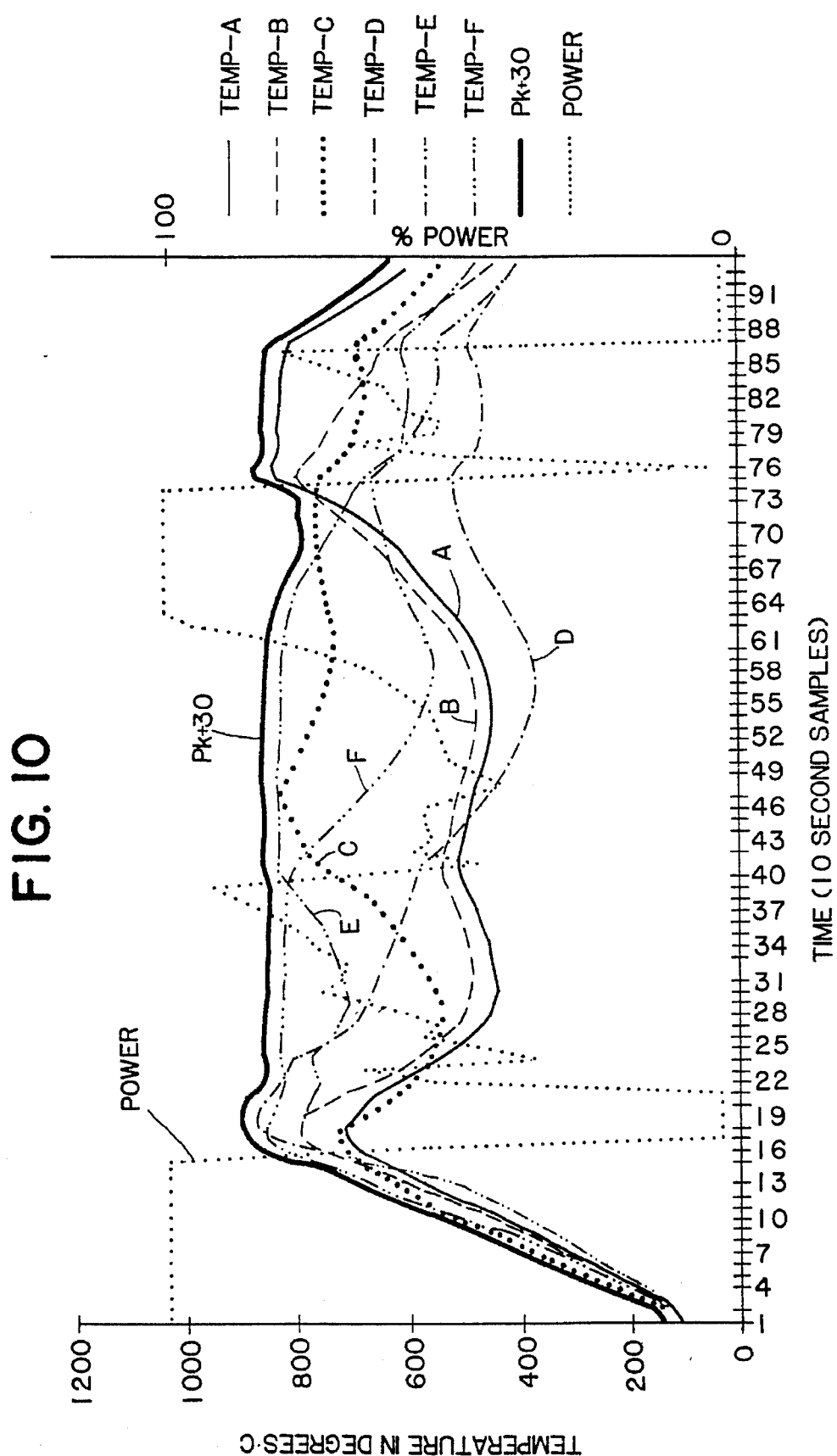
FIG. 10 is a graph of the regeneration cycle of Example 2.

Six, XW3H-019 were assembled to form a six cartridge soot trap of the type shown in FIGS. 1–5. Each cartridge contained a K-type thermocouple which measured temperature. The six cartridges were labeled A through F. The six cartridge soot trap was truck tested using an Isuzu C240 engine. The truck was operated normally for 11.5 hours. A wall mounted regeneration power unit generally shown in FIG. 2 was used. Power to the heaters was controlled by current through a TRIAC semiconductor switch. The power supply was in 220V, AC with a 22 to 24 volt transformer. The power circuit is shown in FIG. 6. A control loop for the power unit was set to a desired set point with temperature band width setting corresponding to 30° C. Temperatures were measured at each thermocouple every 10 seconds. The peak temperature (Pk) of any of the six thermocouples was plotted with the addition of 30° C. (for easier reading) as shown in FIGS. 9 and 10. The regeneration time was set as 15 seconds preheat with 7 minutes regeneration. An air supply as shown in FIG. 2 was connected to the soot trap. The air flow rate was about 200 liters/min. The back pressure was recorded while the engine ran at low/high idle rpm. During the regeneration cycle, measurements of stack temperature were taken at the exhaust outlet at 30 second intervals.

EXAMPLE 1

Example 1 was conducted using the described apparatus with a control loop set point of 650° C. and a band width of 30° C. extending from 620° C. to 650° C. The back pressure after 11.5 hours of normal operation was about 17/94 mm Hg for low/high idle revolutions. Low idle was about 700 rpm and high idle was about 2100 rpm per minute during normal mode operation.

The results of temperature vs. time is shown in FIG. 9. During the regeneration cycle, it was observed that the temperature appeared to rise a little faster than had previously been experienced. Cartridge A was the slowest to achieve a temperature of higher than 550° C. By the end of the preset time all cartridges had reached a peak temperature and as such it was assumed that the regeneration was complete. The back pressures were then seen to have reverted from 17/94 to 5/17 mm Hg for idle/full rpm with no load.

Referring to FIG. 9, the plot of the regeneration cycle showed a two-peak profile. There may have been a non-uniform distribution of air flow through the various cartridges. The lowest temperature cartridge may have had the least amount of soot and so therefore was the coolest. As the soot burned off of various other cartridges, the air flow through these cartridges increased cooling them down and resulting in the heating of cartridges which had residual soot. As these cartridges were heated and the soot burned, their temperatures increased. A review of the total curve shows that when the power increased beyond the set point of 650° C. the power turned off. The power therefore turned off at 650° C. and remained off until the peak temperature dropped below 650° C. at which point it turned on once again. In the time period between 210 seconds and 340 seconds, the peak temperature remained within the band width of 620° C. plus 30° C. While within this band width as the temperature increased and decreased, the power was controlled by a linear proportional controller. At 340 seconds, the temperature once again rose above 680° C. and the power remained off for the remainder of the cycle.

A diesel smoke test was performed using a Bosch smoke meter. The smoke tests which were performed before and after regeneration show values of 0.5 and 0.2 Bosch units respectfully.

EXAMPLE 2

EXAMPLE 1 was repeated except that in EXAMPLE 2 the set point was 820° C. and the band was once again 30° C. from 790° to 820° C. FIG. 10 shows that a relatively flat peak temperature plus 30 profile was attained. The controller regulated the system so that the power was continuously on from 210 seconds to 760 seconds and continuously controlled based on the variation of peak temperature. This curve indicated that a preferred operation range is using a set point of 820° C. with a 30° C. band.

What is claimed is:

1. A system for use in cleaning a particulate filter medium, which medium is to be cleaned by inputting energy to heat particulate matter collected thereon, the system, comprising:
   (a) means for inputting energy to heat the particulate matter collected on the particulate filter medium;
   (b) means for monitoring the temperature of the medium at several points;
   (c) means for determining the point having a maximum individual temperature and creating a control signal commensurate with the maximum temperature;
   (d) means for determining if the control signal exceeds a predetermined set point level and if so reducing the energy input;
   (e) means for determining if the control signal falls within a predetermined range of acceptable values less than the set point level, the range defining the band width, and if so controlling the energy input and varying it as appropriate in order to maintain the control signal within the band width.

2. A method for use in cleaning a particulate filter medium, which medium is to be cleaned by the input of energy to heat particulate matter collected thereon, the method comprising:
   (a) inputting energy to heat the particulate matter collected on the particulate filter medium;
   (b) monitoring the temperature of the medium at several points;
   (c) determining the point having a maximum individual temperature and creating a control signal commensurate with the maximum temperature;
   (d) determining if the control signal exceeds a predetermined set point level and if so reducing the energy input;
   (e) determining if the control signal falls within a predetermined range of acceptable values less than the set point level, the range defining the band width, and if so controlling the energy input and varying it as appropriate in order to maintain the control signal within the band width.

3. A particulate filter including a system according to claim 1.

4. A system, method or filter according to any one of claims 1, 2 or 3 in which the filter medium is provided by at least one ceramic fiber wound cartridge.

5. An apparatus comprising:
   a particulate filter for collecting particulate matter filtered from fluids passing through the particulate filter, the particulate filter comprising at least two particulate filter elements, with each filter element comprising;
   (a) a particulate filter medium,
   (b) a particulate filter support on which the particulate filter medium is supported,
   (c) means for inputting energy to heat the particulate matter collected on the particulate filter medium,
   (d) means for monitoring the temperature of the particulate filter medium of each element at at least one location,
   (e) means for determining the filter element having a maximum individual temperature and creating a control signal commensurate with the maximum temperature;
   (f) means for determining if the control signal exceeds a predetermined set point level and if so reducing the energy input;
   (g) means for determining if the control signal falls within a predetermined range of acceptable values less than the set point level, the range defining the band width, and if so controlling the energy input and varying it as appropriate in order to maintain the control signal within the band width.

6. The apparatus as recited in claim 5 wherein the means for inputting energy comprises the particulate filter support as an electric resistance heating element.

7. The apparatus as recited in claim 6 wherein the particulate filter elements each comprise filter cartridges wherein each cartridge comprises:
   the particulate filter support comprising a cylindrical heating element open on one end, closed on the opposite closed end and having a circumferential surface having holes distributed therethrough, and
   the particulate filter medium comprising ceramic fiber wound on the cylindrical heating element.

8. The apparatus as recited in claim 7 wherein the means for monitoring the temperature comprises at least one thermocouple located in the windings of the ceramic fiber.

9. The apparatus as recited in claim 8 wherein said at least one thermocouple in each cartridge is from 1 to 5 fiber diameters from the circumferential surface of the cylindrical heating element particulate filter support.

10. The apparatus as recited in claim 5 wherein the band width corresponds to up to 100 Centigrade degrees.

11. The apparatus as recited in claim 10 wherein the band width corresponds to from 20 to 60 Centigrade degrees.

12. The apparatus as recited in claim 11 wherein the band width corresponds to from 25 to 40 Centigrade degrees.

13. The apparatus as recited in claim 12 wherein the band width corresponds to from 25 to 35 Centigrade degrees.

14. The apparatus as recited in claim 10 wherein the set point corresponds to from 550 to 1000 Centigrade degrees.

15. The apparatus as recited in claim 14 wherein the set point corresponds to from 650 to 950 Centigrade degrees.

16. The apparatus as recited in claim 15 wherein the set point corresponds to from 750 to 850 Centigrade degrees.

17. A method for use in cleaning a particulate filter for collecting particulate matter filtered from fluids passing through the particulate filter, the particulate filter comprising at least two particulate filter elements, comprising the steps of:

inputting energy to heat particulate matter collected on the filter elements;

monitoring the temperature of the particulate filter medium of each element at at least one location;

determining the filter element having a maximum individual temperature;

creating a control signal commensurate with the maximum temperature;

presetting a predetermined set point and a predetermined range defining a band width;

determining if the control signal exceeds the predetermined set point;

if the control signal exceeds the predetermined set point, reducing the energy input; and determining if the control signal falls within a predetermined range of values less than the set point level and in the range defining the band width, and if so controlling the energy input and varying it as appropriate in order to maintain the control signal within the band width.

18. The method as recited in claim 17 further comprising the steps of:

presetting a predetermined maximum set point, minimum set point and the predetermined range between the maximum and minimum set points defining the band width;

determining if the control signal falls below the minimum set point, and if so increasing the energy input to a maximum value.

19. The method as recited in claim 18 wherein the maximum value of the energy input is in the range of from 6 to 24 volts of AC current.

20. The method as recited in claim 18 wherein if the control signal falls within a predetermined range of values less than the set point level and in the range defining the band width, varying the energy input as a linear function of the control signal.

21. The method as recited in claim 18 wherein the maximum set point corresponds to a temperature of 1050 C.

22. The method as recited in claim 21 wherein the band width corresponds to a temperature range of up to 100 degrees Centigrade.

23. The method as recited in claim 22 wherein the band width corresponds to a temperature range of is from 20 to 60 degrees Centigrade.

24. The method as recited in claim 23 wherein the band width corresponds to a temperature range of from 25 to 40 degrees Centigrade.

25. The method as recited in claim 24 wherein the band width corresponds to a temperature range of from 25 to 35 degrees Centigrade.

26. An apparatus comprising:

an engine having an engine exhaust outlet;

at least two particulate filters in parallel for collecting particulate matter filtered from fluids passing through the particulate filter, the particulate filter comprising at least two particulate filter elements, with each filter element comprising;

(a) a particulate filter medium, and (b) a particulate filter support on which the particulate filter medium is supported;

a means to open at least one of said particulate filters into communication with the engine exhaust outlet; and a means to open at least one of said particulate filters, which is not in communication with the engine exhaust outlet, with a means to regenerate the particulate filter:

the means to regenerate at least one of said particulate filters comprising;

(a) means for inputting energy to heat the particulate matter collected on the particulate filter, (b) means for monitoring the temperature of the particulate filter medium of each element at at least one location, (c) means for determining the filter element having a maximum individual temperature and creating a control signal commensurate with the maximum temperature;

(d) means for determining if the control signal exceeds a predetermined set point level and if so reducing the energy input;

(e) means for determining if the control signal falls within a predetermined range of acceptable values less than the set point level, the range defining the band width, and if so controlling the energy input and varying it as appropriate in order to maintain the control signal within the band width.

* * * * *